(12) United States Patent
Kudo (10) Patent No.: US 11,422,378 B2
(45) Date of Patent: Aug. 23, 2022

(54) CONTROL METHOD FOR DISPLAY DEVICE AND CONTROL DEVICE

(71) Applicant: SEIKO EPSON CORPORATION, Tokyo (JP)

(72) Inventor: Yusuke Kudo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/078,215

(22) Filed: Oct. 23, 2020

(65) Prior Publication Data

US 2021/0124173 A1 Apr. 29, 2021

(30) Foreign Application Priority Data

Oct. 23, 2019 (JP) ............................. JP2019-192541

(51) Int. Cl.
*G02B 27/01* (2006.01)
*H04N 9/31* (2006.01)

(52) U.S. Cl.
CPC ....... *G02B 27/0172* (2013.01); *H04N 9/3185* (2013.01); *H04N 9/3194* (2013.01); *G02B 2027/0138* (2013.01)

(58) Field of Classification Search
CPC .............. G02B 27/017; G02B 27/0172; G02B 2027/0138; H04N 9/3185; H04N 9/3194
See application file for complete search history.

(56) References Cited

U.S. PATENT DOCUMENTS

| 10,235,122 | B1* | 3/2019 | Goel | G06K 9/00597 |
| 10,579,320 | B2 | 3/2020 | Miyasaka et al. | |
| 10,663,844 | B2 | 5/2020 | Urano et al. | |
| 2009/0051823 | A1* | 2/2009 | Tsuru | G08C 17/00 348/734 |
| 2010/0066821 | A1* | 3/2010 | Rosener | G06F 3/147 348/77 |
| 2013/0069985 | A1* | 3/2013 | Wong | G06F 1/163 345/633 |
| 2019/0197989 | A1 | 6/2019 | Kimura | |

FOREIGN PATENT DOCUMENTS

| JP | 2018-174003 A | 11/2018 |
| JP | 2019-110407 A | 7/2019 |
| JP | 2019-114049 A | 7/2019 |

* cited by examiner

*Primary Examiner* — Alexander Eisen
*Assistant Examiner* — Cory A Almeida
(74) *Attorney, Agent, or Firm* — Dority & Manning, P.A.

(57) ABSTRACT

A control method for a display device executed by a control device includes receiving imaging data generated by an imaging device, which sets at least a part of a visual field of a user as an imaging target region, capturing an identification image displayed on a display surface by the display device, the identification image including identification information for identifying the display device, determining, as an operation target device, the display device indicated by the identification information included in the imaging data, and transmitting an operation signal based on operation by the user to the operation target device.

13 Claims, 5 Drawing Sheets

CONTROL METHOD FOR DISPLAY DEVICE
AND CONTROL DEVICE

The present application is based on, and claims priority from JP Application Ser. No. 2019-192541, filed Oct. 23, 2019, the disclosure of which is hereby incorporated by reference herein in its entirety.

BACKGROUND

1. Technical Field

The present disclosure relates to a control method for a display device and a control device.

2. Related Art

JP-A-2019-110407 (Patent Literature 1) describes a PC (Personal Computer) that determines a projector, which is an example of a display device, as an operation target device based on operation by a user. The PC described in Patent Literature 1 displays, on a display section of the PC, a plurality of projectors that are candidates of the operation target device. The user operates an operation section of the PC to thereby determine the operation target device out of the plurality of candidates of the operation target device. Subsequently, the user operates the operation section of the PC to thereby input an operation instruction for the operation target device to the PC. The PC transmits, to the operation target device, an operation signal corresponding to the operation instruction, for example, a command for instructing display of a test pattern.

When the PC described in Patent Literature 1 is used, the user determines the operation target device from the candidates of the operation target device. Therefore, the user needs to operate the operation section of the PC. It takes time to determine the operation target device.

In particular, in a situation in which operation signals are individually sent to a plurality of operation target devices, the user needs to repeat operation for determining one operation target device and operation for inputting one operation instruction. It takes time to repeat the operation.

SUMMARY

A control method for a display device according to the present disclosure is a control method for a display device executed by a control device, the control method including: receiving imaging data generated by an imaging device, which sets at least a part of a visual field of a user as an imaging target region, capturing an identification image displayed on a display surface by the display device, the identification image including identification information for identifying the display device; determining, as an operation target device, the display device indicated by the identification information included in the imaging data; and transmitting an operation signal based on operation by the user to the operation target device.

A control device according to the present disclosure includes: an image receiving section configured to receive imaging data generated by an imaging device, which sets at least a part of a visual field of a user as an imaging target region, capturing an identification image displayed on a display surface by a display device and including identification information for identifying the display device; a determining section configured to determine, as an operation target device, the display device indicated by the identification information included in the imaging data; and a communication section configured to transmit an operation signal based on operation by the user to the operation target device.

DESCRIPTION OF EXEMPLARY EMBODIMENTS

A: First Embodiment

A1: Overview of a Display System 1000

Figure 1:
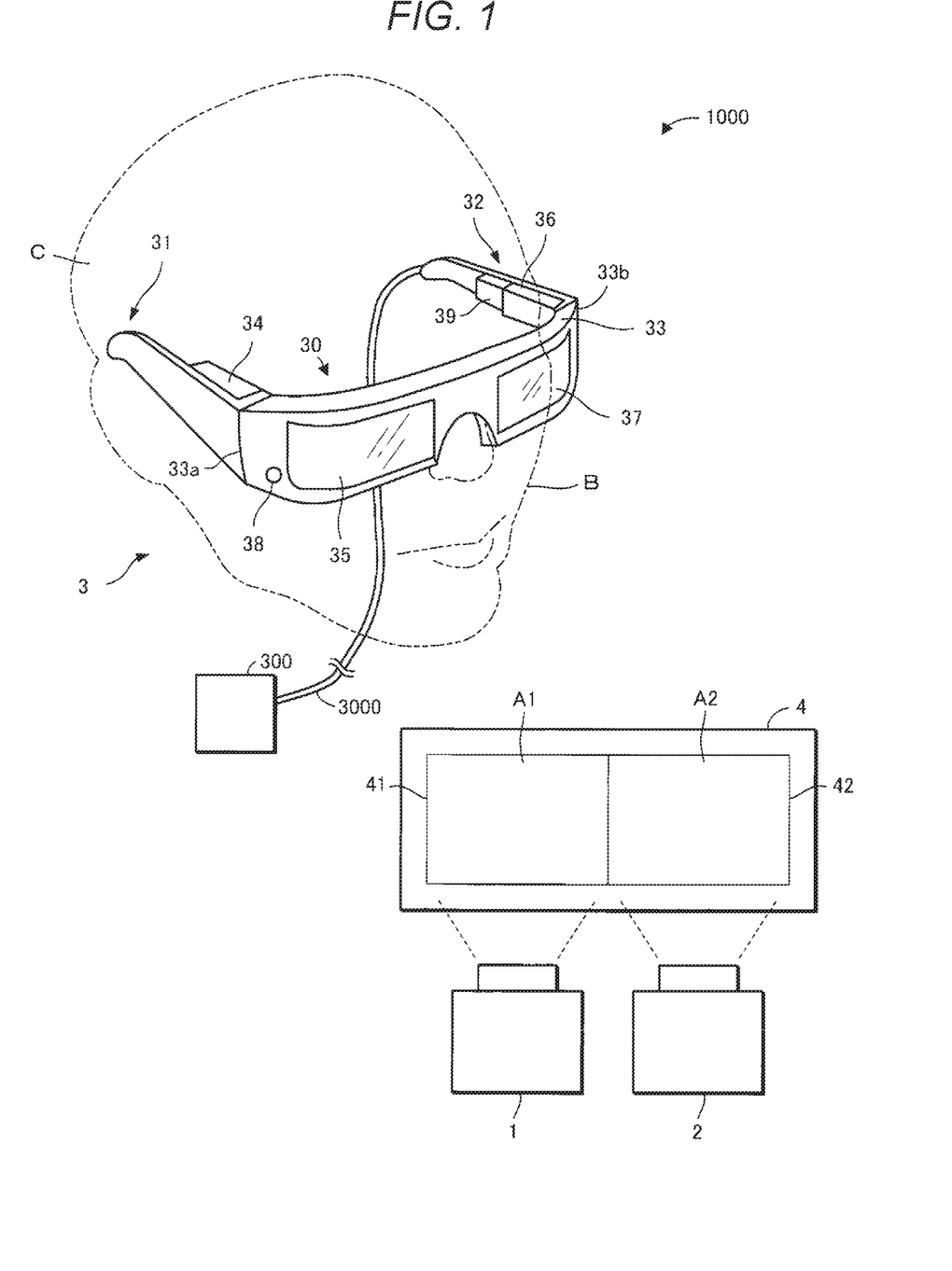
FIG. 1 is a diagram showing a display system according to a first embodiment.

FIG. 1 is a diagram showing a display system 1000 according to a first embodiment. The display system 1000 includes a first projector 1, a second projector 2, and an HMD (Head Mounted display) 3. Each of the first projector 1 and the second projector 2 is an example of a display device. The display device is not limited to the projector and may be a display, for example, an FPD (Flat Patent Display). The FPD is, for example, a liquid crystal display, a plasma display, or an organic EL (Electro Luminescence) display. Each of the first projector 1 and the second projector 2 is an example of a candidate of an operation target device. The first projector 1 has the same configuration as the configuration of the second projector 2.

The first projector 1 projects an image onto a first region 41 of a projection surface 4 to thereby display the image in the first region 41. For example, the first projector 1 projects a first image A1, which is an example of the image, onto the first region 41 of the projection surface 4 to thereby display the first image A1 in the first region 41.

The first image A1 includes first identification information for identifying the first projector 1. The first identification information is shown, for example, in a form perceptible by a user B. As an example, the first identification information is an image showing a name of the first projector 1. The first identification information is not limited to the image showing the name of the first projector 1. For example, the first identification information may be a figure associated with the first projector 1 or a mark associated with the first projector 1. The first image A1 is an example of an identification image.

The second projector 2 projects an image onto a second region 42 of the projection surface 4 to thereby display the image in the second region 42. For example, the second projector 2 projects a second image A2, which is an example of the image, onto the second region 42 of the projection surface 4 to thereby display the second image A2 in the second region 42.

The second image A2 includes second identification information for identifying the second projector 2. The second identification information is shown, for example, in a form perceptible by the user B. As an example, the second identification information is an image showing a name of the second projector 2. The second identification information is not limited to the image showing the name of the second projector 2. For example, the second identification information may be a figure associated with the second projector 2 or a mark associated with the second projector 2. The second image A2 is another example of the identification image.

The projection surface 4 is, for example, a screen. The projection surface 4 is not limited to the screen and may be, for example, a part of a wall, a door, or a whiteboard. The first region 41 and the second region 42 are in contact with each other. The first region 41 may be separated from the second region 42. At least a part of the first region 41 may overlap at least a part of the second region 42. Each of the projection surface 4, the first region 41, and the second region 42 is an example of a display surface.

The HMD 3 is a head-mounted display device. The HMD 3 is worn by the user B. The HMD 3 controls each of the first projector 1 and the second projector 2.

A2. An Example of the First Projector 1

Figure 2:
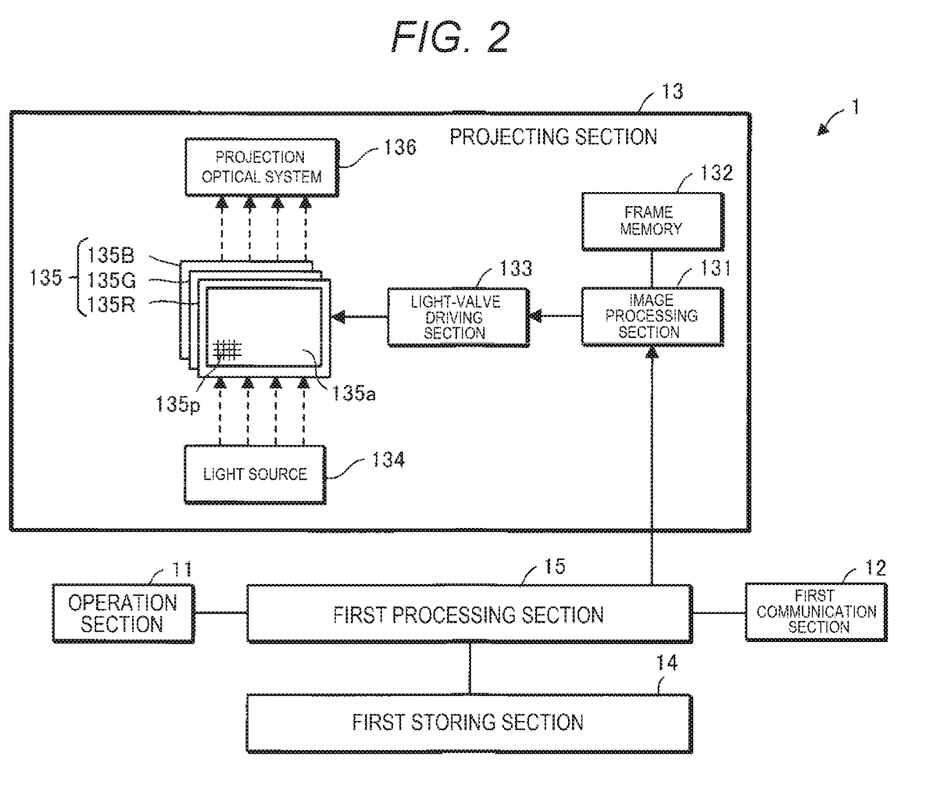
FIG. 2 is a diagram showing an example of a first projector.

The first projector 1 and the second projector 2 have the same configuration as explained above. Accordingly, the first projector 1 is explained as a representative of the first projector 1 and the second projector 2.

FIG. 2 is a diagram showing an example of the first projector 1. The first projector 1 includes an operation section 11, a first communication section 12, a projecting section 13, a first storing section 14, and a first processing section 15.

The operation section 11 is, for example, various operation buttons, an operation key, or a touch panel. The operation section 11 is provided in a housing of the first projector 1. The operation section 11 receives input operation by the user B.

The first communication section 12 communicates with the HMD 3, specifically, a second communication section 391 shown in FIG. 4 explained below by wire or radio. The first communication section 12 communicates with the second communication section 391 through, for example, wireless LAN (Local Area Network). A communication scheme of wireless communication between the first communication section 12 and the second communication section 391 is not limited to the wireless LAN and may be other communication schemes, for example, Bluetooth. Bluetooth is a registered trademark.

The projecting section 13 projects the first image A1 onto the first region 41 to thereby display the first image A1 in the first region 41. The projecting section 13 includes an image processing section 131, a frame memory 132, a light-valve driving section 133, a light source 134, a liquid crystal light valve for red 135R, a liquid crystal light valve for green 135G, a liquid crystal light valve for blue 135B, and a projection optical system 136. In the following explanation, when it is unnecessary to distinguish the liquid crystal light valve for red 135R, the liquid crystal light valve for green 135G, the liquid crystal light valve for blue 135B from one another, these liquid crystal light valves are referred to as "liquid crystal light valve 135".

The image processing section 131 is configured by a single or a plurality of circuits such as image processors. The image processing section 131 receives image data from, for example, the first processing section 15. The image processing section 131 may receive image data from a not-shown image supply device. The image supply device is, for example, a PC. The image supply device is not limited to the PC and may be, for example, a tablet terminal, a smartphone, a video player, a DVD (Digital Versatile Disc) player, a Blu-ray disc player, a hard disc recorder, a television tuner device, or a video game machine.

The image processing section 131 develops image data in the frame memory 132. The frame memory 132 is configured by a storage device such as a RAM (Random Access Memory). The image processing section 131 applies image processing to the image data developed in the frame memory 132 to thereby generate an image signal.

The image processing executed by the image processing section 131 includes, for example, geometric correction processing for correcting trapezoidal distortion of an image projected by the projecting section 13. The image processing section 131 may execute other image processing, for example, resolution conversion processing in addition to the geometric correction processing. In the resolution conversion processing, the image processing section 131 converts the resolution of image data into, for example, the resolution of the liquid crystal light valve 135. The other image processing is not limited to the resolution conversion processing. The other image processing may be, for example, OSD (On Screen Display) processing for superimposing an OSD image on an image indicated by image data provided from the image supply device.

The light-valve driving section 133 is configured by a circuit such as a driver. The light-valve driving section 133 generates a driving voltage based on the image signal provided from the image processing section 131. The light-valve driving section 133 applies the driving voltage to the liquid crystal light valve 135 to thereby drive the liquid crystal light valve 135.

The light source 134 is, for example, an LED (light emitting diode). The light source 134 is not limited to the LED and may be, for example, a Xenon lamp, an ultrahigh pressure mercury lamp, or a laser light source. The light source 134 emits light. The light emitted from the light source 134 is made incident on a not-shown integrator optical system. The integrator optical system reduces fluctuation in a luminance distribution in the light emitted from the light source 134. The light emitted from the light source 134 passes through the integrator optical system and is thereafter separated into color light components of red, green, and blue, which are the three primary colors of light, by a not-shown color separation optical system. The color light component of red is made incident on the liquid crystal light valve for red 135R. The color light component of green is made incident on the liquid crystal light valve for green 135G. The color light component of blue is made incident on the liquid crystal light valve for blue 135B.

The liquid crystal light valve 135 is configured by a liquid crystal panel or the like in which liquid crystal is present between a pair of transparent substrates. The liquid crystal light valve 135 includes a rectangular pixel region 135a including a plurality of pixels 135p located in a matrix shape. In the liquid crystal light valve 135, a driving voltage based on an image signal is applied to the liquid crystal for each of the pixels 135p. When the light-valve driving section 133 applies the driving voltage to the pixels 135p, the pixels 135p are set to a light transmission rate based on the driving voltage. The light emitted from the light source 134 passes through the pixel region 135a to be modulated. Accordingly, an image based on the image signal is formed for each of the color lights. The liquid crystal light valve 135 is an example of a light modulation device.

Images having the colors are combined for each of the pixels 135p by a not-shown color combination optical system. Accordingly, a color image is generated. The color image is projected via the projection optical system 136.

The first storing section 14 is a recording medium readable by the first processing section 15. The first storing section 14 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read Only Memory). The volatile memory is, for example, a RAM.

The first storing section 14 stores a control program to be executed by the first processing section 15 and various data to be used by the first processing section 15.

The first processing section 15 is configured by, for example, a single or a plurality of processors. As an example, the first processing section 15 is configured by a single or a plurality of CPUs (Central Processing Units). A part or all of functions of the first processing section 15 may be realized by a circuit such as a DSP (Digital Signal Processor), an ASIC (Application Specific Integrated Circuit), a PLD (Programmable Logic Device), or an FPGA (Field Programmable Gate Array). The first processing section 15 executes various kinds of processing in parallel or sequentially. The first processing section 15 reads a control program from the first storing section 14. The first processing section 15 executes the control program read from the first storing section 14 to thereby execute various operations.

A3. An Example of the HMD 3

Referring back to FIG. 1, the HMD 3 includes a main body 30 and an operation input section 300. The operation input section 300 is electrically coupled to the main body 30 via a connection cord 3000. The operation input section 300 may be electrically coupled to the main body 30 by radio rather than wire. The operation input section 300 is, for example, a portable operation panel. The operation input section 300 receives operation by the user B. The operation input section 300 outputs operation data based on the operation by the user B to the main body 30.

The main body 30 is an eyeglass-type wearable device worn on a head C of the user B. The main body 30 is not limited to the eyeglass-type wearable device. The main body 30 only has to be a device worn on the head C of the user B.

A4. An Example of the Main Body 30

Figure 3:
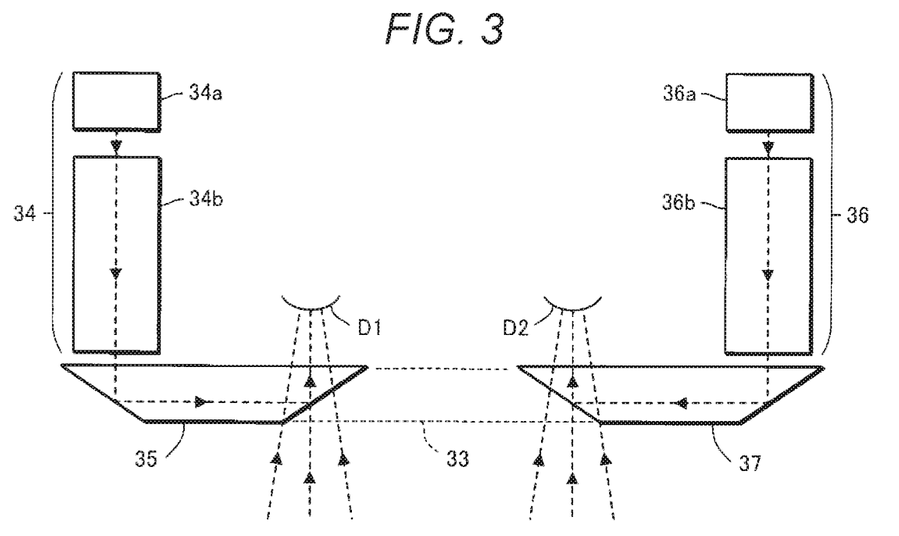
FIG. 3 is a schematic diagram showing the configuration of an optical system included in a main body.

FIG. 3 is a schematic diagram showing the configuration of an optical system included in the main body 30. The main body 30 is explained below with reference to FIGS. 1 and 3.

The main body 30 includes a right holding section 31, a left holding section 32, a frame 33, a right display unit 34, a right light guide plate 35, a left display unit 36, a left light guide plate 37, a camera 38, and a control device 39.

The right holding section 31 extends to the rear of the main body 30 from a right end portion 33a of the frame 33. The left holding section 32 extends to the rear of the main body 30 from a left end portion 33b of the frame 33.

The right display unit 34 outputs image light for the right eye. In the following explanation, the image light for the right eye is referred to as "right image light". The right display unit 34 includes, as illustrated in FIG. 3, a right-image output section 34a and a right optical system 34b. The right-image output section 34a is, for example, an OLED (Organic Light Emitting Diode). The OLED is referred to as organic EL display as well. The right-image output section 34a is not limited to the OLED and may be, for example, a liquid crystal display with a backlight or a plasma display. The right-image output section 34a is an example of a determination-result output device. The right image output section 34a outputs the right image light. The right optical system 34b includes a collimate lens that collimates the right image light output from the right-image output section 34a into a light beam in a parallel state. The right image light is output to the right light guide plate 35 after being collimated into the light beam in the parallel state.

The right light guide plate 35 is, for example, a prism. The right light guide plate 35 guides external light to a right eye D1 of the user B. The right light guide plate 35 further guides the right image light to the right eye D1 of the user B.

The left display unit 36 outputs image light for the left eye. In the following explanation, the image light for the left eye is referred to as "lift image light". The left display unit 36 includes a left-image output section 36a and a left optical system 36b. The left-image output section 36a is, for example, an OLED. The left-image output section 36a is not limited to the LED and may be, for example, a liquid crystal display with a backlight or a plasma display. The left-image output section 36a is another example of the determination-result output device. The left-image output section 36a outputs the left image light. The left optical system 36b includes a collimate lens that collimates the left image light output from the left-image output section 36a into a light beam in a parallel state. The left image light is output to the left light guide plate 37 after being collimated into the light beam in the parallel state.

The left light guide plate 37 is, for example, a prism. The left light guide plate 37 guides external light to a left eye D2 of the user B. The left light guide plate 37 further guides the left image light to the left eye D2 of the user B.

Accordingly, when the user B wears the main body 30, the user B is capable of visually recognizing the outside scene, the right image light, and the left image light. The outside scene means the visual field of the user B. The right image light and the left image light may be generated based on a parallax.

The camera 38 shown in FIG. 1 is an example of an imaging device. The camera 38 includes a light receiving optical system such as a lens and an imaging element that converts light condensed by the light receiving optical system into an electric signal.

The imaging element is, for example, a CCD (Charge Coupled Device) image sensor that receives light in an infrared region and a visible light region. The imaging element is not limited to the CCD image sensor and may be, for example, a CMOS (Complementary Metal Oxide Semiconductor) image sensor that receives lights in the infrared region and the visible light region.

The camera 38 is provided in the frame 33. The camera 38 sets the front of the main body 30 as an imaging target region. Accordingly, when the main body 30 is worn by the user B like eyeglasses, the camera 38 sets at least a part of the visual field of the user B as the imaging target region. The camera 38 generates imaging data by imaging the imaging target region. The imaging data indicates a captured image representing the imaging target region.

In this embodiment, the camera 38 is disposed in the frame 33 such that the center of the captured image coincides with the center of the visual field of the user B. The camera 38 is located between the right light guide plate 35 and the right holding section 31. The position of the camera 38 is not limited to the position between the right light guide plate 35 and the right holding section 31. For example, the position of the camera 38 may be the position between the right light guide plate 35 and the left light guide plate 37 or between the left light guide plate 37 and the left holding section 32. The camera 38 may be provided in the right holding section 31 or may be provided in the left holding section 32. Even when the camera 38 is disposed in such a position, it is desirable that the center of the captured image coincides with the center of the visual field of the user B.

The center of the captured image may be different from the center of the visual field of the user B.

The control device 39 is provided in the left holding section 32. The control device 39 may be provided in the frame 33 rather than in the left holding section 32. The control device 39 may be provided in the right holding section 31.

The control device 39 receives imaging data from the camera 38. The control device 39 receives operation data from the operation input section 300. The control device 39 controls the first projector 1 and the second projector 2 using the imaging data and the operation data.

A5. An Example of the Control Device 39

Figure 4:
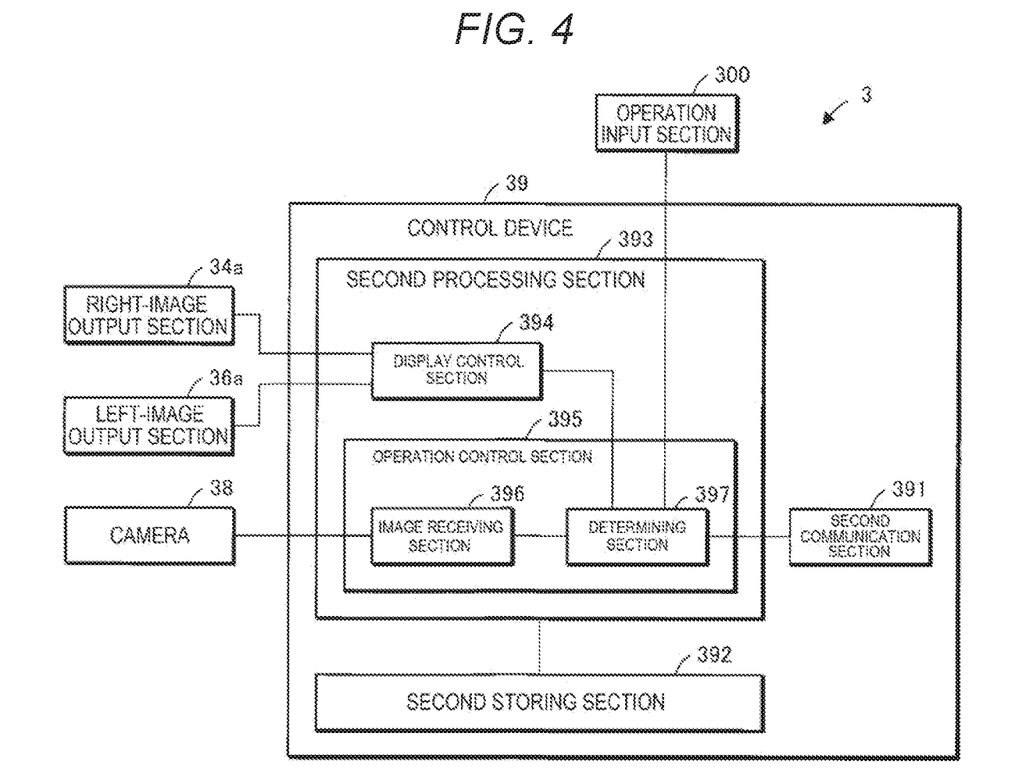
FIG. 4 is a diagram showing an example of a control device.

FIG. 4 is a diagram showing an example of the control device 39. The control device 39 includes a second communication section 391, a second storing section 392, and a second processing section 393.

The second communication section 391 communicates with the first projector 1 and the second projector 2. For example, the second communication section 391 communicates with the first communication section 12 of the first projector 1.

The second storing section 392 is a recording medium readable by the second processing section 393. The second storing section 392 includes, for example, a nonvolatile memory and a volatile memory.

The second storing section 392 stores a control program to be executed by the second processing section 393 and various data to be used by the second processing section 393. The control program stored in the second storing section 392 can be referred to as "application program" or "application software" as well. The various data to be used by the second processing section 393 includes correspondence data indicating a mutual correspondence relation between the first identification information and the name of the first projector 1 and a mutual correspondence relation between the second identification information and the name of the second projector 2.

The second processing section 393 is configured by, for example, a single or a plurality of processors. As an example, the second processing section 393 is configured by a single or a plurality of CPUs. A part or all of functions of the second processing section 393 may be realized by a circuit such as a DSP, an ASIC, a PLD, or an FPGA. The second processing section 393 executes various kinds of processing in parallel or sequentially.

The second processing section 393 reads the control program from the second storing section 392. The second processing section 393 executes the control program read from the second storing section 392 to thereby realize a display control section 394 and an operation control section 395.

The display control section 394 controls the right-image output section 34a and the left-image output section 36a. For example, the display control section 394 outputs right image data indicating right image light to the right-image output section 34a. The right-image output section 34a outputs the right image light indicated by the right image data. The display control section 394 outputs left image data indicating left image light to the left-image output section 36a. The left-image output section 36a outputs the left image light indicated by the left image data. The display control section 394 may be configured by a circuit such as a display controller or a display control circuit.

The operation control section 395 controls the operation of the control device 39. The operation control section 395 may be configured by a circuit such as an operation controller or an operation control circuit. The operation control section 395 includes an image receiving section 396 and a determining section 397.

The image receiving section 396 receives image data from the camera 38. The image receiving section 396 may be configured by a circuit such as an image receiver or an image reception circuit. The image receiving section 396 may be configured by an input terminal to which the image data is input.

The determining section 397 determines, as an operation target device, a projector indicated by identification information represented by imaging data. Specifically, the determining section 397 determines, as the operation target device, a projector indicated by identification information included in an identification image represented by the imaging data. When receiving operation data from the operation input section 300 after the determination of the operation target device, the determining section 397 causes the second communication section 391 to transmit an operation signal based on the operation data to the operation target device. In other words, the second communication section 391 transmits an operation signal based on the operation data to the operation target device. The determining section 397 may be configured by a circuit such as a processor or a determination circuit.

A6. An Example of the First Image A1 and an Example of the Second Image A2

Figure 5:
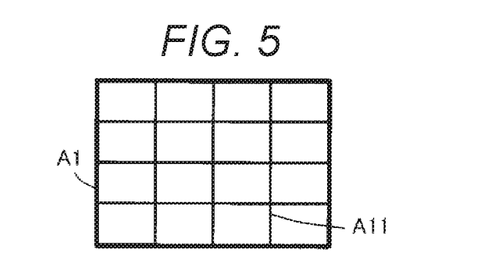
FIG. 5 is a diagram showing an example of a first image projected by the first projector.
Figure 6:
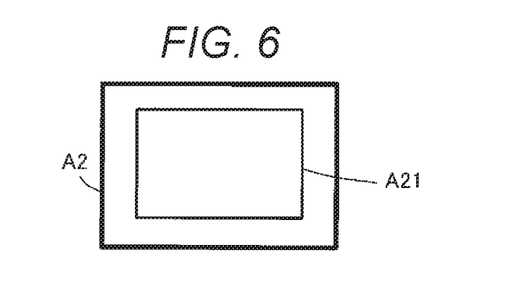
FIG. 6 is a diagram showing an example of a second image projected by a second projector.

FIG. 5 is a diagram showing an example of the first image A1 projected by the first projector 1. FIG. 6 is a diagram showing an example of the second image A2 projected by the second projector 2.

The first image A1 includes a first figure A11 as the first identification information. The first figure A11 is a lattice-like figure. The second image A2 includes a second figure A21 as the second identification information. The second figure A21 is a rectangular figure.

In this case, the second storing section 392 stores correspondence data in which the first figure A11 and the name of the first projector 1 are associated with each other and the second figure A21 and the name of the second projector 2 are associated with each other. Accordingly, the first figure A11 indirectly indicates the first projector 1. The second figure A21 indirectly indicates the second projector 2.

In FIG. 5, the first figure A11 extends across the entire surface of the first image A1. However, the first figure A11 may be located in a partial region of the first image A1. The partial region of the first image A1 is, for example, a region obtained by excluding an edge portion of the first image A1 from the first image A1, a region below the center position of the first image A1, or a region above the center position of the first image A1.

In the second figure A21, a region where the second image A2 is present is not limited to the region shown in FIG. 6. For example, in the second figure A21, the region where the second image A2 is present may be a region below the center position of the second image A2 or a region above the center position of the second image A2.

The first identification information is not limited to the first figure A11. For example, the first identification information may be an image showing an IP (Internet Protocol) address of the first projector 1 or an image having a first color such as red. The first color is not limited to red and may be a color different from red. The second identification information is not limited to the second figure A21. For example, the second identification information may be an image showing an IP address of the second projector 2 or an image having a second color such as green. The second color is not limited to green. The second color only has to be a color different from the first color.

A7. Operation of the Control Device 39

Figure 7:
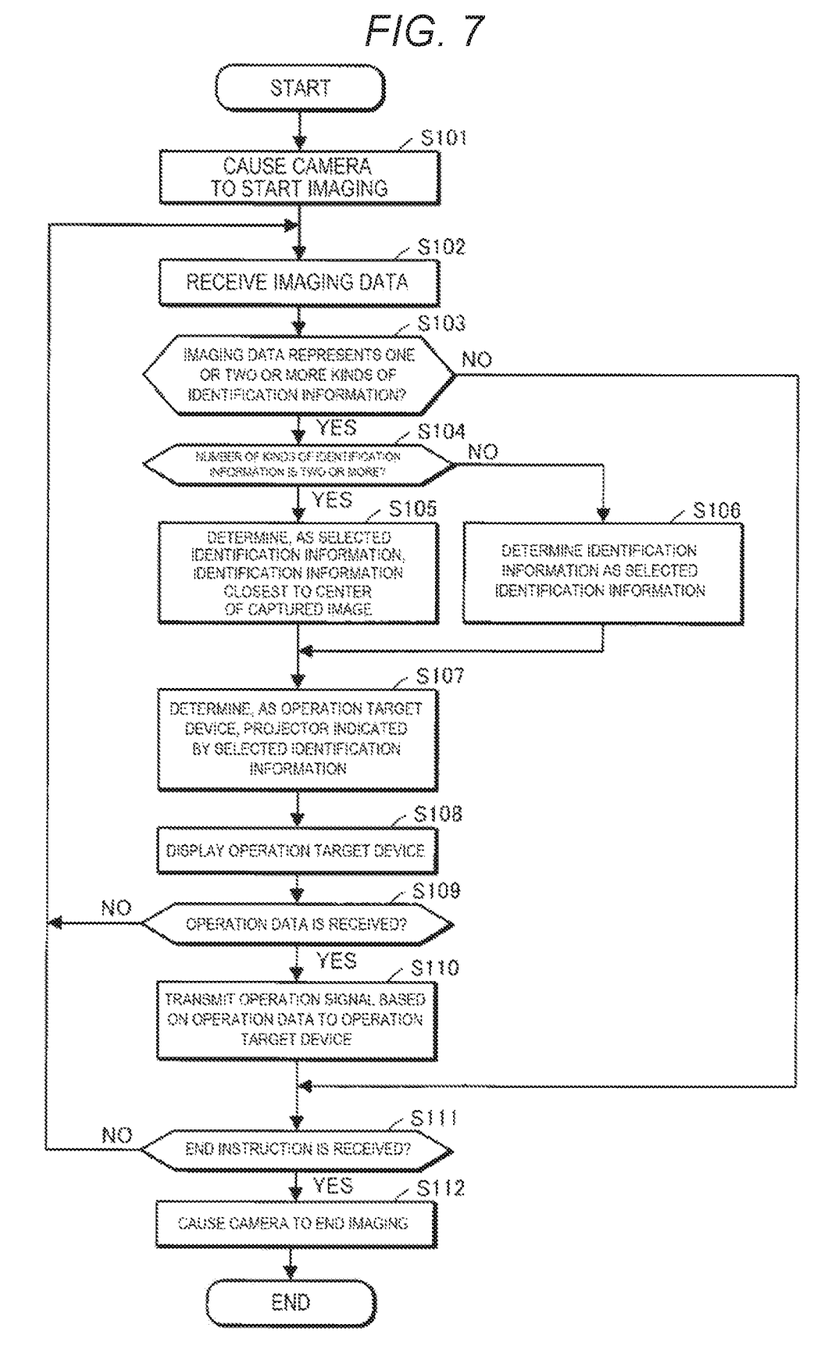
FIG. 7 is a flowchart showing the operation of the control device.

FIG. 7 is a flowchart showing the operation of the control device 39. In the following explanation, it is assumed that the first projector 1 is projecting the first image A1 onto the first region 41, the second projector 2 is projecting the second image A2 onto the second region 42, and the user B wears the main body 30 on the head C. When it is unnecessary to distinguish the first projector 1 and the second projector 2 from each other, these projectors are referred to as "projector 100".

When the user B inputs an individual operation instruction to the operation input section 300 in order to individually operate the projector 100, the second processing section 393 reads the control program from the second storing section 392 and executes the control program. Accordingly, the second processing section 393 realizes the display control section 394, the operation control section 395, the image receiving section 396, and the determining section 397.

In step S101, the determining section 397 causes the camera 38 to start imaging. Since the user B wears the maim body 30 on the head C, the camera 38 sets at least a part of the visual field of the user B as an imaging target region. Accordingly, imaging data generated by the camera 38 is highly likely to represent, for example, an image that the user B is intentionally viewing. The user B intentionally views an image projected by the projector 100 that the user B desires to set as an operation target device. For example, the user B views the first image A1. When the first image A1 and the second image A2 are in contact with each other on the projection surface 4, even if the user B views the first image A1, the imaging data sometimes indicates the second image A2 in addition to the first image A1. The camera 38 transmits the imaging data to the control device 39.

Subsequently, in step S102, the image receiving section 396 receives the imaging data from the camera 38. The image receiving section 396 outputs the imaging data to the determining section 397.

Subsequently, in step S103, the determining section 397 determines whether the imaging data represents one or two or more kinds of identification information. For example, the determining section 397 determines whether at least one of a plurality of kinds of identification information indicated by the correspondence data stored in the second storing section 392 is represented by the imaging data.

In step S103, the determining section 397 may determine whether a situation in which the imaging data represents one or two or more kinds of identification information continues for one second or more. In this case, for example, it is possible to exclude the identification information included in an image accidentally captured while the user B is changing the direction of the head C. Accordingly, it is possible to determine whether one or two or more kinds of identification information that the user B is intentionally viewing is present. One second is an example of a predetermined time.

The predetermined time may be longer than one second. The predetermined time may be shorter than one second.

When the imaging data represents one or two or more kinds of identification information in step S103, in step S104, the determining section 397 determines whether the imaging data represents two or more kinds of identification information.

When the imaging data represents two or more kinds of identification information in step S104, in step S105, the determining section 397 determines, among the two or more kinds of identification information, the identification information closest to the center of a captured image as selected identification information. The center of the captured image is an example of a predetermined position of the captured image. The predetermined position of the captured image is not limited to the center of the captured image and can be changed as appropriate. As explained above, the center of the captured image coincides with the center of the visual field of the user B or the vicinity of the center of the visual field of the user B. Accordingly, when the predetermined position of the captured image is the center of the captured image, it is easy to determine, as the selected identification information, the identification information included in an image that the user B is intentionally viewing.

In step S105, for example, the determining section 397 operates as explained below.

First, the determining section 397 specifies, for each of the kinds of identification information, identification regions representing the identification information in the captured image. Subsequently, the determining section 397 determines, for each of the identification regions, the center of gravity positions of the identification regions. Subsequently, the determining section 397 determines, among the center of gravity positions of the identification regions, the center of gravity position closest to the center of the captured image. Subsequently, the determining section 397 determines, as selected identification information, the identification information represented in the identification region having the center of gravity position closest to the center of the captured image.

For example, in a situation in which the captured image shows the first figure A11 and the second figure A21, when the distance from the center of gravity position of the first figure A11 to the center of the captured image is shorter than the distance from the center of gravity position of the second figure A21 to the center of the captured image, the determining section 397 determines the first figure A11 as the selected identification information.

In step S105, the determining section 397 may operate as explained below.

First, the determining section 397 specifies, for each of the kinds of identification information, identification regions representing the identification information in the captured image. Subsequently, the determining section 397 specifies, for each of the identification regions, a shortest distance to the center of the captured image as a region distance. Subsequently, the determining section 397 specifies, among the identification regions, the identification region having the shortest region distance. Subsequently, the determining section 397 determines, as the selected identification information, the identification information represented in the identification region having the shortest region distance.

On the other hand, when the imaging data represents one kind of identification information in step S104, in step S106, the determining section 397 determines the identification information as the selected identification information.

When the selected identification information is determined in step S105 or step S106, in step S107, the determining section 397 determines the projector 100 indicated by the selected identification information as an operation target device. For example, the determining section 397 determines the projector 100 indicated by the selected identification information as the operation target device by referring to the correspondence data. As an example, when the first figure A11 is determined as the selected identification information, the determining section 397 determines the first projector 1 as the operation target device by referring to the correspondence data.

Subsequently, the determining section 397 outputs determination information indicating a name of the projector 100 determined as the operation target device to the display control section 394. Subsequently, in step S108, the display control section 394 causes the right-image output section 34a to output right image light representing the name of the projector 100 indicated by the determination information. Further, in step S108, the display control section 394 causes the left-image output section 36a to output left image light representing the name of the projector 100 indicated by the determination information. The right image light is guided to the right eye D1 of the user B via the right optical system 34b and the right light guide plate 35. The left image light, is guided to the left eye D2 of the user B via the left optical system 36b and the left light guide plate 37. Accordingly, the user B can visually recognize the projector 100 determined as the operation target device.

After visually recognizing the operation target device, the user B performs operation on the operation input section 300. The operation input section 300 outputs operation data based on the operation by the user B to the control device 39.

Subsequently, in step S109, the determining section 397 determines whether the operation data is received within a predetermined time, for example, five seconds after the determination of the operation target device. When the determining section 397 does not receive the operation data within the predetermined time after the determination of the operation target device, the processing returns to step S102. Accordingly, when the operation data is not received within the predetermined time after the determination of the operation target device, it is possible to update the operation target device. The predetermined time may be longer than five seconds or may be shorter than five seconds.

When receiving the operation data within the predetermined time after the determination of the operation target device in step S109, in step S110, the determining section 397 causes the second communication section 391 to transmit an operation signal based on the operation data to the operation target device. For example, when the operation data received after the determination of the operation target device indicates start operation for starting the geometric correction processing, the determining section 397 causes the second communication section 391 to transmit an operation signal indicating the start of the geometric correction processing to the operation target device.

The projector 100 determined as the operation target device executes operation indicated by the operation signal. For example, in a situation in which the first projector 1 is the operation target device, when the first communication section 12 receives the operation signal indicating the start of the geometric correction processing, the first processing section 15 outputs operation image data indicating an operation image, which receives operation of the geometric correction processing, to the projecting section 13. The projecting section 13 displays the operation image in the first region 41 based on the operation image data. Thereafter, the user B causes the first projector 1 to execute the geometric correction processing using the operation image.

The operation signal is not limited to a signal indicating the start operation for starting the geometric correction processing. For example, the operation signal may be a signal indicating operation for brightening a projected image of the operation target device or a signal indicating operation for darkening the projected image of the operation target device.

Subsequently, when the operation input section 300 does not receive an end instruction in step S111, the processing returns to step S102. Accordingly, for example, when the user B desires to change the operation target device from the first projector 1 to the second projector 2, the user B only has to change the direction of the head C from a direction toward the first image A1 to a direction toward the second image A2.

On the other hand, when the operation input section 300 receives the end instruction in step S111, in step S112, the determining section 397 causes the camera 38 to end the imaging.

When the imaging data does not represent the identification information in step S103, the processing proceeds to step S111.

A8. Overview about the First Embodiment

The display method and the display device according to this embodiment explained above include the following aspects.

The image receiving section 396 receives, from the camera 38 that sets at least a part of the visual field of the user B as the imaging target region, imaging data generated by the camera 38 when the camera 38 captures the first image A1. The determining section 397 determines, as the operation target device, the first projector 1 indicated by the first identification information in the first image A1 represented by the imaging data. The second communication section 391 transmits an operation signal based on the operation by the user B to the operation target device.

According to this aspect, if the user B visually recognizes the first image A1, the first projector 1 is automatically determined as the operation target device. Accordingly, since the user B determines the operation target device from the candidates of the operation target device, the user B does not need to operate an operation section of a PC or the like. The user B can save time.

The camera 38 is provided in the main body 30. According to this aspect, it is possible to easily realize the camera 38 that sets at least a part of the visual field of the user B as the imaging target region.

The control device 39 is provided in the main body 30. According to this aspect, the user B can easily carry control device 39.

The camera 38 and the control device 39 are provided in the main body 30. According to this aspect, the user B can treat the camera 38 and the control device 39 as one body. Therefore, convenience of use is improved compared with a configuration in which the camera 38 and the control device 39 are separate bodies.

When the first identification information and the second identification information are included in the imaging data and the distance from the position of the first identification information in the captured image to the predetermined position of the captured image is shorter than the distance from the position of the second identification information in the captured image to the predetermined position of the captured image, the determining section 397 determines, as the operation target device, the first projector a indicating the first identification information included in the imaging data.

According to this aspect, even if the first identification information and the second identification information are included in the imaging data, when the user B views the first image A1, the user B can easily determine the first projector 1 as the operation target device.

B. Modifications

Aspects of modifications of the embodiment illustrated above are illustrated below. Two or more aspects optionally selected out of the following illustrations may be combined as appropriate in a range in which the aspects do not contradict one another.

B1. First Modification

In the first embodiment, luminance in a portion allocated to the first identification information in the first image A1 may change based on the first identification information according to time elapsing. In this case, the determining section 397 uses, as the identification information, information indicated by the change in the luminance involved in the time elapsing among the information included in the imaging data. According to this aspect, the determining section 397 can determine the operation target device using the change in the luminance involved in the time elapsing. The portion allocated to the first identification information in the first image A1 means a portion used to represent the first identification information in the first image A1.

The change in the luminance based on the first identification information desirably has a frequency equal to or higher than 60 Hz, for example, a frequency of 120 Hz. A human cannot recognize a change in luminance having the frequency equal to or higher than 60 Hz. Accordingly, when the change in the luminance based on the first identification information has the frequency equal to or higher than 60 Hz, the determining section 397 can obtain the first identification information without the first identification information being visually recognized by the user B.

The first image A1 may be a still image to which a luminance change having the frequency equal to or higher than 60 Hz based on the first identification information is applied. In this case, the user B cannot recognize the luminance change and recognizes the first image A1 as a mere still image. Accordingly, the first projector 1 can simultaneously display the first identification information and the still image without giving discomfort to the user B.

Luminance in a portion allocated to the second identification information in the second image A2 may change based on the second identification information according to time elapsing. In this case, the determining section 397 uses, as the identification information, information indicated by the change in the luminance involved, in the time elapsing among the information included in the imaging data. The portion allocated to the second identification information in the second image A2 means a portion used to represent the second identification information in the second image A2.

Figure 8:
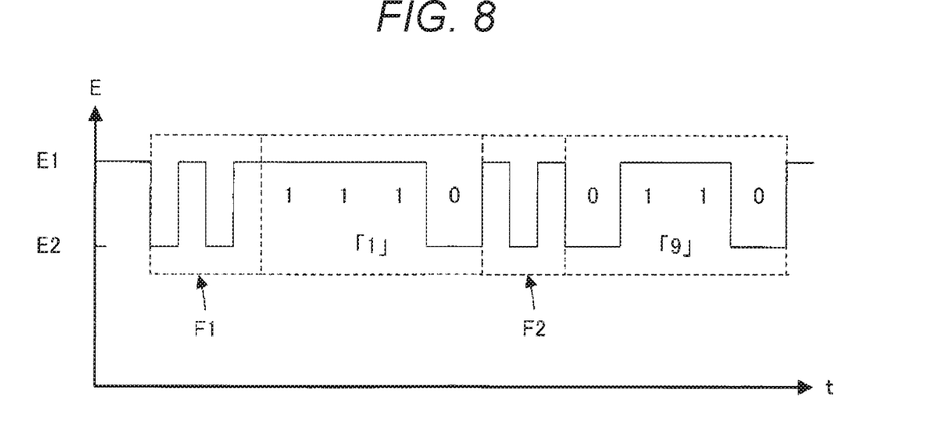
FIG. 8 is a diagram showing an example of luminance that changes based on first identification information according to time elapsing in the first image.

FIG. 8 is a diagram showing an example of the luminance that changes based on the first identification information according to the time elapsing in the first image A1. In FIG. 8, an IP address of the first projector 1 is used as the first identification information.

In this case, numerical values used in the IP address are indicated by four bits. "1" in the bits is represented by first luminance E1 and "0" in the bits is represented by second luminance E2.

Accordingly, a numerical value "1" used in the IP address is represented as "0001". A numerical value "9" used in the IP address is represented as "1001". A numerical value "2" used in the IP address is represented as "0010".

In FIG. 8, the first luminance E1 is higher than the second luminance E2. The first luminance E1 may be lower than the second luminance E2. As shown in FIG. 8, a start marker F1 indicating a start position and a segmentation marker F2 indicating segmentation for each four bits are used.

In FIG. 8, the IP address of the first projector 1 is used as the first identification information. However, the first identification information is not limited to the IP address of the first projector 1. For example, when a wireless LAN to which the first projector 1 belongs and a wireless LAN to which the second projector 2 belongs are different from each other, an SSID (Service Set Identifier) of the wireless LAN to which the first projector 1 belongs may be used as the first identification information. In this case, an SSID of the wireless LAN to which the second projector 2 belongs may be used as the second identification information.

B2. Second Modification

In the first embodiment, the portion allocated to the first identification information in the first image A1 may include infrared light indicating the first identification information. In this case, the determining section 397 uses, as the identification information, information indicated by the infrared light among the information included in the imaging data. According to this aspect, the determining section 397 can determine the operation target device using the infrared light not visually recognized by the user B. In this aspect, the camera 38 preferably performs imaging via an infrared light filter that does not transmit visible light and transmits infrared light.

The first image A1 may be an image superimposed with the infrared light indicating the first identification information for example, a still image or a moving image. In this case, the user B cannot recognize the first identification information and recognizes the first image A1 as a mere image. Accordingly, the first projector 1 can simultaneously display the first identification information and the still image without giving discomfort to the user B.

The portion allocated to the second identification information in the second image A2 may include infrared light indicating the second identification information. In this case, the determining section 397 uses, as the identification information, information indicated by the infrared light among the information included in the imaging data.

B3. Third Modification

In the first embodiment, the first modification, and the second modification, the number of projectors 100 included in the display system 1000 is not limited to two and may be one or may be three or more.

B4. Fourth Modification

In the first embodiment and the first to third modifications, the control device 39 may be provided in a device different from the main body 30, for example, a PC. In this case, it is possible to achieve a reduction in the weight of the main body 30.

B5. Fifth Modification

In the first embodiment and the first to fourth modifications, the liquid crystal light valve 135 is used as an example of the light modulation device in the projector 100. However, the light modulation device is not limited to the liquid crystal light valve and can be changed as appropriate. For example, the light modulating device may a device including three reflection-type liquid crystal panels. The light modulation device may be a type including one liquid crystal panel, a type including three digital mirror devices (DMDs), or a type including one digital mirror device. When only one liquid crystal panel or DMD is used as the light modulation device, members equivalent to the color separation optical system and the color combination optical system are unnecessary. Besides the liquid crystal panel and the DMD, a device capable of modulating light emitted by the light source 134 can be adopted as the light modulation device.

B6. Sixth Modification

In the first embodiment and the first to fifth modifications, when the FPD is used as the display device, the FPD may be an FPD used in an electronic blackboard or an electronic conference system.

B7. Seventh Modification

In the first embodiment and the first to sixth modifications, the control device 39 causes the right-image output section 34a and the left-image output section 36a, which function as the determination-result output device, to execute the operation for informing the user B of the determination result of the operation target device. The determination-result output device is not limited to the right-image output section 34a and the left-image output section 36a. For example, a speaker that informs the user B of the determination result of the operation target device by sound may be used as the determination-result output device. Since the determination-result output device informs the user B of the determination result of the operation target device, the user B can easily learn the determination result of the operation target device.

What is claimed is:

1. A control method, for a display device, executed by a control device, the control method comprising:
   receiving imaging data generated by an imaging device, which sets at least a part of a visual field of a user as an imaging target region,
   capturing an image including a first identification image displayed on a display surface by the display device, and a second identification image displayed on the display surface by another display device, wherein the first identification image includes first identification information for identifying the display device, and the second identification image includes second identification information for identifying the another display device;
   determining, as an operation target device, the display device indicated by the first identification information included in the imaging data when the first identification information is closer to a center of the image than the second identification information; and
   transmitting an operation signal based on operation by the user to the operation target device.

2. The control method for the display device according to claim 1, wherein the imaging device is provided in a device worn on a head of the user.

3. The control method for the display device according to claim 1, wherein the control device is provided in a device worn on a head of the user.

4. The control method for the display device according to claim 1, wherein the imaging device and the control device are provided in a device worn on a head of the user.

5. The control method for the display device according to claim 1, wherein
   luminance in a portion allocated to the first identification information in the identification image changes based on the identification information according to time elapsing, and
   the control method further comprises using, as the first identification information, information indicated by the change in the luminance involved in the time elapsing among information included in the imaging data.

6. The control method for the display device according to claim 5, wherein the change in the luminance involved in the time elapsing has a frequency equal to or higher than 60 Hz.

7. The control method for the display device according to claim 1, wherein
   a portion allocated to the first identification information in the first identification image includes infrared light indicating the first identification information, and
   the control method further comprises using, as the first identification information, information indicated by the infrared light among information included in the imaging data.

8. The control method for the display device according to claim 1, further comprising causing a determination-result output device to inform the user of a determination result of the operation target device.

9. The control method for the display device according to claim 1, wherein the display device is determined as the operation target device when a center of gravity of the first identification is closer to a center of the image than a center of gravity of the second identification information.

10. The control method for the display device according to claim 1, wherein the display device is determined to be the operation target device if the first identification information is determined to be in the imaging target region for a predetermined amount of time.

11. A control device comprising:
    at least one circuit configured to:
       receive imaging data generated by an imaging device, which sets at least a part of a visual field of a user as an imaging target region, capturing an image including a first identification image displayed on a display surface by a display device and a second identification image displayed on the display surface by another display device, wherein the first identification image includes first identification information for identifying the display device, and the second identification image includes second identification information for identifying the another display device;
       determine, as an operation target device, the display device indicated by the first identification information included in the imaging data when the first identification information is closer to a center of the image than the second identification information; and
    transmitter configured to transmit an operation signal based on operation by the user to the operation target device.

12. The control device according to claim 11, wherein the display device is determined as the operation target device when a center of gravity of the first identification is closer to a center of the image than a center of gravity of the second identification information.

13. The control device according to claim 11, wherein the display device is determined to be the operation target device if the first identification information is determined to be in the imaging target region for a predetermined amount of time.

* * * * *